C. A. READ.
Egg-Forks.

No. 158,312.

Patented Dec. 29, 1874.

WITNESSES
E. H. Bates
Robert Everett

INVENTOR
Charles A. Read
Chipman & Fosmer & Co,
ATTORNEYS

UNITED STATES PATENT OFFICE.

CHARLES A. READ, OF BRIDGEPORT, CONNECTICUT.

IMPROVEMENT IN EGG-FORKS.

Specification forming part of Letters Patent No. 158,312, dated December 29, 1874; application filed October 24, 1874.

*To all whom it may concern:*

Be it known that I, CHARLES A. READ, of Bridgeport, in the county of Fairfield and State of Connecticut, have invented a new and valuable Improvement in Egg-Forks; and I do hereby declare that the following is a full, clear, and exact description of the construction and operation of the same, reference being had to the annexed drawings, making a part of this specification, and to the letters and figures of reference marked thereon.

Figure 1:
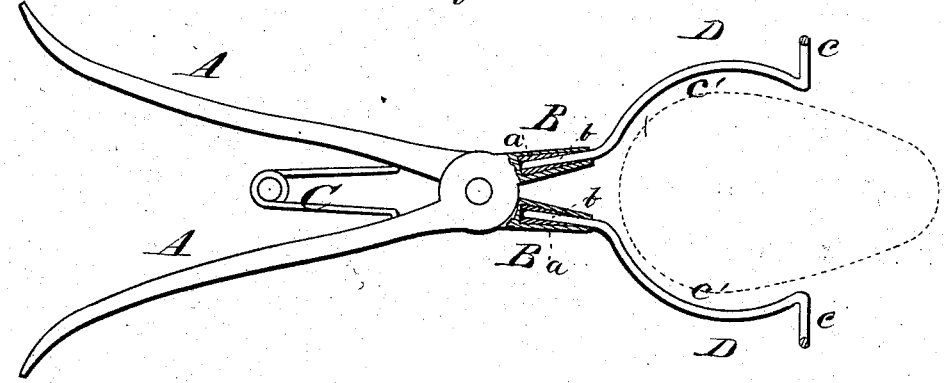
Figure 2:
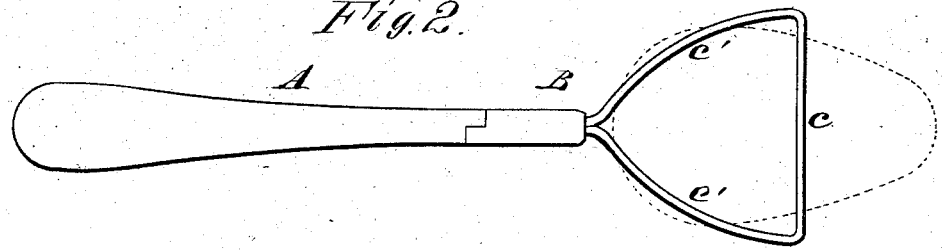

Figure 1 of the drawing is a representation of a side view, part sectional, of my egg-fork; and Fig. 2 is a top view of the same.

The object of this invention is to improve devices which are designed for holding hot eggs while removing the shells from them.

The nature of my invention and improvement consists in so constructing the holding-jaws that, when an egg is once griped between them, the shell of such egg can be completely removed without changing its position between the jaws, as will be understood from the following description:

In the annexed drawings, A A designate the handles of the device, which are halved together like a pair of pliers or shears, and constructed with jaws B B, in which recesses $a$ are made, as shown in Fig. 1. Between the two handles a spring, C, is applied, which reacts to keep the jaws B B open. D D designate two skeleton clamps, each one of which is composed of a single wire, bent so as to form an open spoon-shaped jaw and a pair of straight shanks, $b\,b$. The shanks of the clamping-jaws D D are inserted into the recesses $a\,a$ of the rigid jaws B B, and permanently confined therein by means of solder. The curved connecting portions $c\,c$ of the clamping or holding jaws are shaped so as to embrace the egg diametrically, while the portions $c'\,c'$ embrace the egg longitudinally. The two jaws are sufficiently elastic to prevent an egg confined between them from being accidentally crushed while holding it, and these jaws being made of wire, as described, they afford access to every part of an egg which is held between them, and allow, in the case of hard-boiled eggs, the shells to be completely removed without changing the position of the eggs after once grasping them.

I am not the first inventor of a device for holding hot eggs for the purpose of removing portions of their shells, and I do not make a broad claim thereto.

The device which I have reference to will admit only of the removal of a small portion of the shell from one end of the egg.

I am also aware that double ladles, made of wire, and having handles, a tongue, and eye, and fork for the removal of vegetables from a boiler or pot have heretofore been employed, and I therefore lay no claim to such invention, which could not be employed conveniently to hold eggs from its configuration; nor could the shell of the egg, if held between the eyes, be entirely removed without changing its position, in consequence of the spiral form of the wires forming the ladles preventing the removal of the entire shell, while in my invention the open or skeleton form of the egg-holders affords access to every part of an egg held between them, and thus allows the ready removal of the entire shell without changing the position of the egg.

What I claim as new, and desire to secure by Letters Patent, is—

As a new article of manufacture, an egg-holder consisting of two elastic open or skeleton wire jaws, D D, secured in recesses in the jaws B B of the handles A A, pivoted together and provided with a spring, C, as and for the purpose set forth.

In testimony that I claim the above I have hereunto subscribed my name in the presence of two witnesses.

CHARLES A. READ.

Witnesses:
 GEO. W. WARNER,
 FRED. W. READ.